(12) United States Patent
LaTurner, Jr. et al.

(10) Patent No.: US 10,809,867 B2
(45) Date of Patent: *Oct. 20, 2020

(54) EXTERNAL DATA SERVICE INTEGRATION TO ENHANCE DATA FIELD METADATA

(71) Applicant: International Business Machines Corporation, Armonk, NY (US)

(72) Inventors: Robert R. LaTurner, Jr., Sammamish, WA (US); Brett E. Morris, Arlington, VA (US); Brian J. Owings, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,268

(22) Filed: Sep. 17, 2014

(65) Prior Publication Data

US 2015/0007095 A1    Jan. 1, 2015

Related U.S. Application Data

(63) Continuation of application No. 13/932,879, filed on Jul. 1, 2013.

(51) Int. Cl.
  *G06F 3/0484*    (2013.01)
  *G06F 3/0481*    (2013.01)

(52) U.S. Cl.
  CPC ................... *G06F 3/0481* (2013.01)

(58) Field of Classification Search
  CPC ..................................................... G06F 3/0484
  See application file for complete search history.

(56) References Cited

U.S. PATENT DOCUMENTS

| | | | |
|---|---|---|---|
| 5,497,491 A | 3/1996 | Mitchell et al. | |
| 6,959,288 B1 | 10/2005 | Medina et al. | |
| 7,483,979 B1 | 1/2009 | Prager | |
| 8,234,562 B1* | 7/2012 | Evans | G06F 17/243 715/221 |
| 2003/0126212 A1* | 7/2003 | Morris | G06F 17/30265 709/205 |
| 2006/0053083 A1* | 3/2006 | Wiest | G06Q 30/02 705/80 |
| 2006/0085452 A1* | 4/2006 | Cope | G06Q 10/06 |
| 2006/0242109 A1* | 10/2006 | Pereira et al. | 707/1 |
| 2008/0250004 A1* | 10/2008 | Dettinger | G06F 16/903 |

(Continued)

OTHER PUBLICATIONS

U.S. Appl. No. 13/932,879, by Robert R. LaTurner, Jr. et al., filed Jul. 1, 2013.

(Continued)

*Primary Examiner* — Seth A Silverman
(74) *Attorney, Agent, or Firm* — Janaki K. Davda; Konrad Raynes Davda & Victor LLP

(57) ABSTRACT

An external data service can be integrated to enhance the metadata of workflow data fields. In response to processing a data field, a request may be sent to a metadata service for a metadata associated with the data field. In response to receiving the metadata, the metadata may be applied to the data field such that the data field as presented in a user interface is constrained according to one or more characteristics defined by the metadata.

9 Claims, 5 Drawing Sheets

(56) References Cited

U.S. PATENT DOCUMENTS

| | | | |
|---|---|---|---|
| 2009/0182610 A1* | 7/2009 | Palanisamy | G06Q 10/10 707/600 |
| 2010/0115437 A1 | 5/2010 | Engel et al. | |
| 2011/0125756 A1 | 5/2011 | Spence et al. | |
| 2011/0125827 A1 | 5/2011 | Ramanathan et al. | |
| 2011/0185282 A1 | 7/2011 | Mahmood et al. | |
| 2013/0204894 A1* | 8/2013 | Faith | G06Q 30/0631 707/769 |
| 2015/0007094 A1 | 1/2015 | LaTurner, Jr. et al. | |

OTHER PUBLICATIONS

Office Action from U.S. Appl. No. 13/932,879, dated Oct. 1, 2015, 24 pp.
Response to the Office Action dated May 10, 2016, from U.S. Appl. No. 13/932,879, filed Aug. 10, 2016, 7 pp.
Office Action from U.S. Appl. No. 13/932,879, dated May 10, 2016, 22 pp.
Advisory Action from U.S. Appl. No. 13/932,879, dated Nov. 30, 2016, 2 pp.
Amendment in Response to the Final Office Action dated Sep. 20, 2016, from U.S. Appl. No. 13/932,879, filed Nov. 18, 2016, 9 pp.
Final Office Action from U.S. Appl. No. 13/932,879, dated Sep. 20, 2016 30 pgs.
Office Action from U.S. Appl. No. 13/932,879, dated Jul. 13, 2017, 21 pp.
Response to Office Action dated Jul. 13, 2017, from U.S. Appl. No. 13/932,879, filed Oct. 13, 2017, 11 pp.
Final Office Action from U.S. Appl No. 13/932,879, dated Dec. 14, 2017, 23 pp.
Response to the Final Office Action dated Dec. 14, 2017, from U.S. Appl. No. 13/932,879, filed Mar. 13, 2018, 9 pp.
Office Action from U.S. Appl. No. 13/932,879, dated Jun. 18, 2018, 19 pp.
Response to Office Action dated Jun. 18, 2018, from U.S. Appl. No. 13/932,879, filed Sep. 18, 2018, 14 pp.
Final Office Action from U.S. Appl. No. 13/932,879, dated Nov. 16, 2018, 30 pp.
Office Action from U.S. Appl. No. 13/932,879, dated Mar. 11, 2019, 23 pp.
Response to Final Office Action dated Nov. 16, 2018, from U.S. Appl. No. 13/932,879, filed Feb. 11, 2019, 9 pp.
Response to Office Action dated Mar. 11, 2019, from U.S. Appl. No. 13/932,879, filed Jun. 11, 2019, 10 pp.
Office Action from U.S. Appl. No. 13/932,789, dated Jul. 12, 2019, 29 pp.
Appendix P List of IBM Patents of Patent Applications Treated as Related (2 pp.).
Preliminary Amendment dated Sep. 17, 2014, pp. 6 for U.S. Appl. No. 13/932,879, filed Jul. 1, 2013.
Office Action dated Mar. 26, 2015, pp. 22, for U.S. Appl. No. 13/932,879.
Response dated Jun. 26, 2015, pp. 10, to Office Action dated Mar. 26, 2015, pp. 22, for U.S. Appl. No. 13/932,879.
Amendment dated Dec. 30, 2015, pp. 9, to Final Office Action dated Oct. 1, 2015, pp. 24, for U.S. Appl. No. 13/932,879.
Amendment dated Nov. 18, 2019, pp. 11, to Final Office Action dated Jul. 12, 2019, pp. 29, for U.S. Appl. No. 13/932,879.
Office Action dated Mar. 3, 2020, pp. 36, for U.S. Appl. No. 13/932,879.
Response dated Apr. 21, 2020, pp. 13, to Office Action dated Mar. 3, 2020, pp. 36, for U.S. Appl. No. 13/932,879.
Notice of Allowance dated May 13, 2020, pp. 12, for U.S. Appl. No. 13/932,879.

* cited by examiner

EXTERNAL DATA SERVICE INTEGRATION TO ENHANCE DATA FIELD METADATA

This application is a Continuation of U.S. application Ser. No. 13/932,879, filed Jul. 1, 2013 entitled EXTERNAL DATA SERVICE INTEGRATION TO ENHANCE DATA FIELD METADATA, the entire content of which is incorporated herein by reference.

TECHNICAL FIELD

The disclosure relates to defining one or more characteristics of data fields in a computer application.

BACKGROUND

Workflows may be processed to generate one or more work items relating to an associated piece of content. The work items may include data fields that are presented to users. Users may input values into the data fields based on the associated content to complete the work items. For example, the data fields may be presented as graphical user interface elements such as text fields, drop-down lists, radio buttons, and the like in an application, such as a web application presented to the user. The user may interact with the graphical user interface elements to input or select a value in the data fields. In some examples, the workflow may be presented to the user as a series of steps, where a user may be required to fill out the data fields in one step of the workflow before being allowed to proceed to the next step in the workflow.

SUMMARY

In general, the disclosure describes techniques for providing enhanced metadata to define the behavior of workflow data fields, including integrating an external data service to provide the enhanced metadata. Such metadata may be associated with data fields and may constrain the associated data fields as they are presented in a user interface to a user. If a process engine that processes the workflows do not provide sufficient metadata to be able to define all aspects of a data field's appearance and behavior, it may be desirable to integrate enhanced metadata from an external data service to provide metadata that can better define the desired appearance and behavior of data fields of workflows processed by the process engine, thereby augmenting the user experience of completing work items of a workflow.

In one aspect, the disclosure is directed to a method. The method may include in response to processing a data field, by at least one processor, sending a request to a metadata service for a metadata associated with the data field. The method may further include in response to receiving the metadata, by the at least one processor, applying the metadata to the data field such that the data field as presented in a user interface is constrained according to one or more characteristics defined by the metadata.

In another aspect, the disclosure is directed to a system. The system may include at least one processor. The system may further include at least one memory. The system may further include at least one module stored by the at least one memory and running on the at least one processor, wherein the at least one module is configured to perform operations comprising: in response to processing a data field, sending a request to a metadata service for a metadata associated with the data field; and in response to receiving the metadata, applying the metadata to the data field such that the data field as presented in a user interface is constrained according to one or more characteristics defined by the metadata.

In another aspect, the disclosure is directed to a computer program product. The computer program product may comprise a computer readable storage medium having program code embodied therewith, the program code executable by at least one processor to: in response to processing a data field, send a request to a metadata service for a metadata associated with the data field; and in response to receiving the metadata, apply the metadata to the data field such that the data field as presented in a user interface is constrained according to one or more characteristics defined by the metadata.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
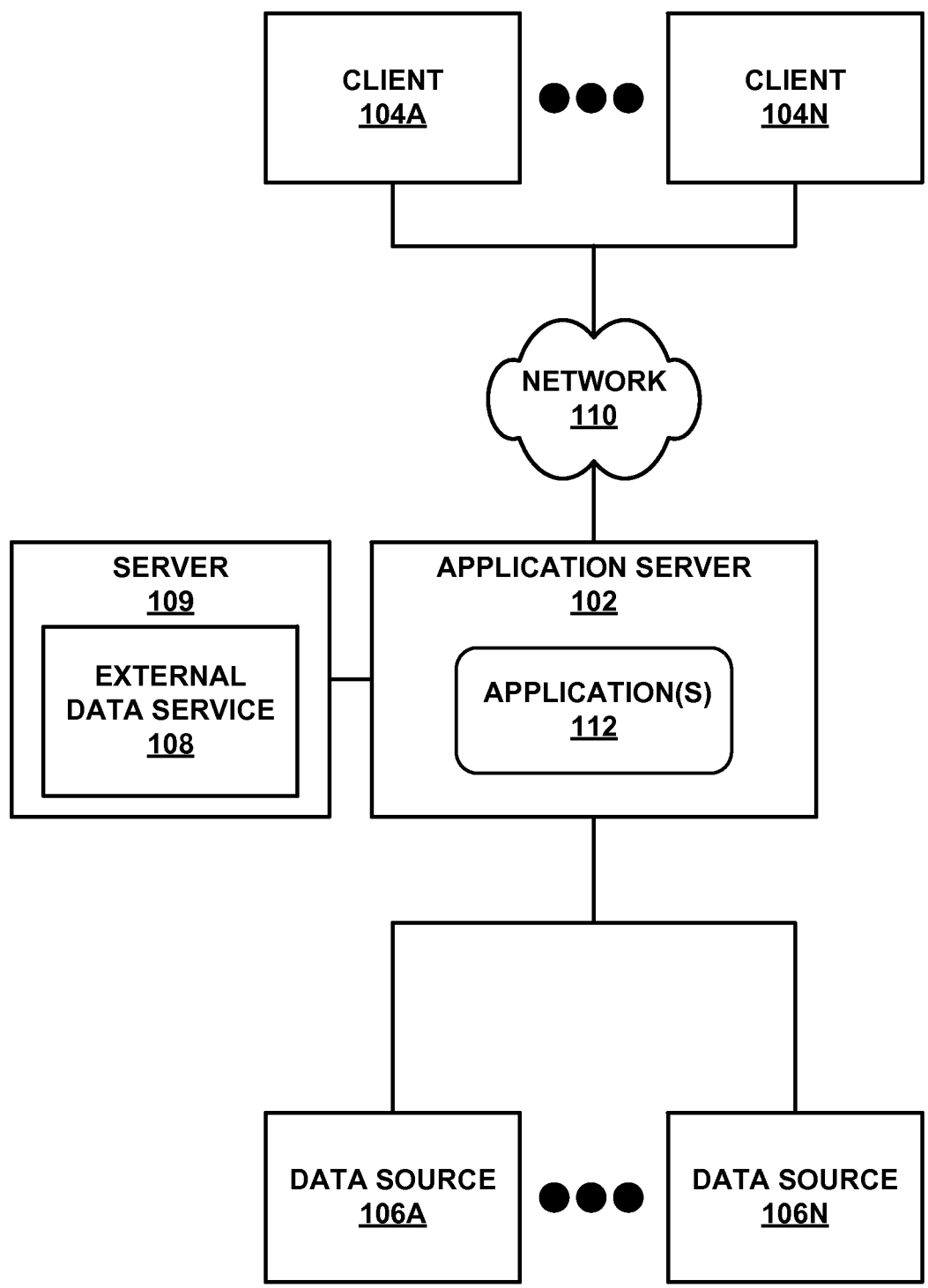
FIG. 1 is a block diagram illustrating an example environment that may be configured to provide client-server communication, according to some aspects of the present disclosure.

FIG. 1 is a block diagram illustrating an example environment that may be configured to provide client-server communication, according to some aspects of the present disclosure. As shown in FIG. 1, clients 104A-104N (hereafter "clients 104") may be communicatively coupled with application server 102 via network 110 to access applications 112. Applications 112 may utilize data stored on data sources 106A-106N (hereafter "data sources 106") and may utilize services provided by external data service 108. In one example, clients 104 may display a user interface for applications 112 at a display device operably coupled to client 104A. The user interface of the application may present, for example, one or more data fields into which users may input values via input devices of client 104.

Clients 104 may include computing devices, such as laptop computers, desktop computers, tablet devices, smartphones, personal digital assistants and the like. An application such as a web browser or a dedicated computer application may execute on clients 104 to interact with applications 112 running on application server 102.

Network 110 may be any computer network that allows computing devices to exchange data. For example, network 110 may be the Internet, a local area network (LAN), a wide area network (WAN), and the like.

Application server 102 may include a computing system that may respond to requests across network 110 to provide one or more computing services. For example, application server 102 may be a web server. Application server 102 may store applications 112 that may be accessed by computing devices, such as clients 104, over a network such as network 110. In some examples, applications 112 may be web applications that are coded in a web programming language, such as HyperText Markup Language (HTML), JavaScript, or a combination thereof, that can be parsed, interpreted and/or executed by applications, such as web browsers, on clients 104. In some examples, applications 112 may include server-side executable code that may be executed on application server 102. In some other examples, applications 112 may include client-side executable code that may be executed by a web browser on clients 104.

In some examples, applications 112 may allow users of clients 104 to work with content hosted on data sources 116. Data sources 116 may include one or more databases or other data storage. Data sources 116, in some examples, may be included in application server 102. In other examples, data sources 116 may be external servers that communicate with application server 102 via a network. Applications 112 may enable the users to browse, view, search, edit, annotate, organize and otherwise work with the content hosted on data sources 116. Display devices (not shown) operably coupled to clients 104 may display the user interface of applications 112 to users of client 104, and the users may interact with applications 112, such as by inputting values into data fields of application 112 or by interacting with user interface elements in the user interface of applications 112 using input devices (not shown) operably coupled to clients 104.

Applications 112 may include one or more workflows. A workflow may include a series of work items, and each work item may be a task to be performed based on the content hosted on data sources 116. For example, the workflow may be presented one work item at a time as an ordered series of work items to a user, and a user may be required to complete one work item before being able to proceed to work on the next work item in the workflow. The user may complete the work flow by working through the series of work items in the workflow.

The work items of a workflow may include one or more data fields into which a user may input values into to complete the work items. For example, applications 112 may execute to present one or more data fields at an output device of client 104. In some examples, a display device operably coupled to client 104 may display a user interface that represents the data fields as text boxes, buttons, drop-down lists, checkboxes, radio buttons, or any other suitable graphical user interface (GUI) widgets and controls. A user may utilize an input device of client 104 to input values into the data fields presented at the output device of client 104.

External data service 108 may provide additional services to applications 112. For example, external data service 108 may provide metadata that may be associated with one or more data fields in application 112 to define behavior of associated data fields. External data service 108 may also provide a data validation service to validate values inputted into one or more data fields in application 112. In some examples, external data service 108 may be stored in application server 102. In other examples, external data service 108 may be stored in an external server, such as server 109, that may communicate with application server 102 via a network, such as the internet.

The behavior of the one or more data fields presented by client 104 may be constrained according to one or more characteristics defined by the metadata provided by external data service 108. A piece of metadata may be associated with a specific data field and may define one or more constraints for the associated data field, such as minimum and maximum values accepted by the data field, acceptable data formatting of values accepted by the data field, whether the data field is read only, whether the data field is hidden, whether the values listed in the data field is dependent upon an input of another data field, and the like. Metadata for data fields is discussed below in more detail with respect to FIG. 3.

Figure 2:
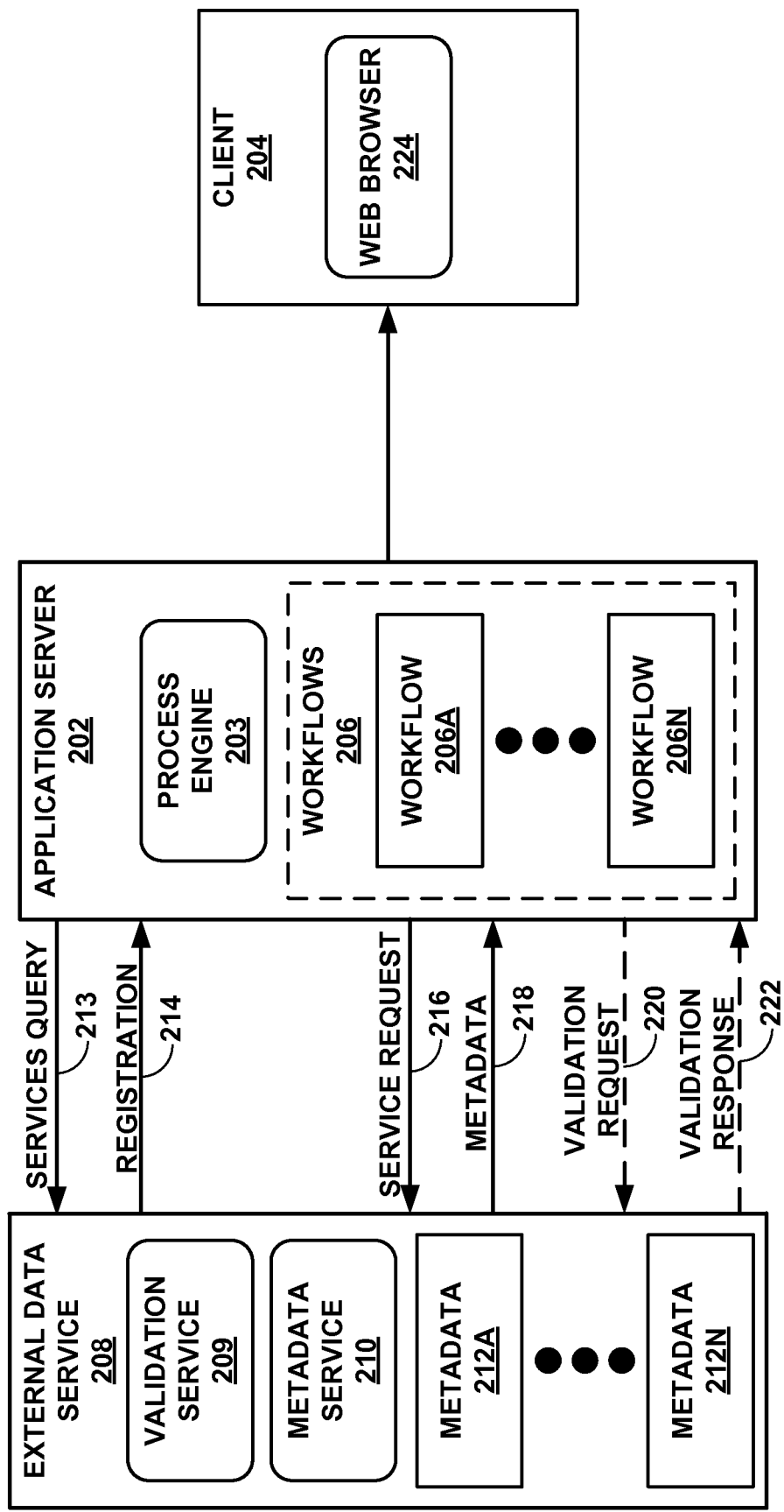
FIG. 2 is a block diagram illustrating an example external data service that provides metadata for an example workflow and that provides external validation services, according to some aspects of the present disclosure.

FIG. 2 is a block diagram illustrating an example external data service that provides metadata for an example workflow and that provides external validation services according to some aspects of the present disclosure. As shown in FIG. 2, application server 202, similar to application server 102 shown in FIG. 1, shown in FIG. 1, is communicatively coupled with external data service 208, similar to external data service 108 shown in FIG. 1, and is also communicatively coupled with client 204, similar to one of clients 104 shown in FIG. 1.

Application server 202 may include process engine 203 that provides workflow management capabilities such as personal inboxes, work object routing, group queues, process tracking, process orchestration, and the like for applications and users that access content in one or more data sources (not shown), such as data sources 106 shown in FIG. 1. Process engine 203 may also process workflows 206 that act on content from the one or more data sources. In some examples, process engine 203 may, upon launching a workflow, create one or more work items. Work items may each contain one or more data fields into which a user of client 204 may input values. For example, a user may use client 204 to view the content associated with a particular workflow and to input values into the data fields of the work items in the workflow based on the content.

A user may use client 204 to communicate with application server 202 to access one or more work items of a workflow and to input values into the data fields of the work items. Client 204 may include a web browser 224 that may retrieve and present the data fields of the work items from application server 202 and may provide a user interface that the user may utilize to input values into the data fields. Web browser 224 may also visually present to the user the content associated with the work items. The data fields of the workflow as presented by web browser 224 may behave according to metadata associated with the data fields. For example, metadata associated with a data field may specify minimum and/or maximum values for the data field, a default value of the data field, whether a value is required to be inputted into the data field, and the like. Metadata for data fields is discussed below in more detail with respect to FIG. 3.

In some examples, process engine 203 may convert work items of a workflow into a web application that may be retrieved by and presented by web browser 224. In some examples, the web application is a client-side application that includes code that executes on client 104 via web browser 224. In other examples, the web application may be a server-side application that execute on application server 202, or may be an application that runs on both client 104 and application server 202.

Application server 202 may send services query 213 to external data service 208 to query external data service 208 regarding any external services that it offers to application server 202. In response, external data service 208 may send registration request 214 to application server 202 to register itself as providing one or more external services, such as validation service 209 and metadata service 210, to one or more data fields. Registration request 214 may identify targets, such as one or more data fields of specific workflows that are supported by external data service 208. For example, registration request 214 may identify one or more workflows of workflows 206 that it supports, or may identify one or more data fields of a specific workflow of workflows 206 that it supports. In one example, registration request 214 may include one or more multi-part strings, such as <workflow name>.<sheet name>.<step name> that identifies a workflow, a sheet in the workflow, and a step of the sheet that uses one or more external services provided by external data service 208, where a workflow may have one or more sheets, and where a sheet in a workflow may have one or more steps. In some examples, registration request 214 may support an optional 4-part string, such as <workflow name>.<sheet name>.<step name>.<EDS_Service_Value>, where EDS_Service_Value may be a value of an exposed custom data field called "EDS_Service" for the particular <step name>. Registration request 214 may also include a Universal Resource Locator (URL) of external validation service 208 to which application server 202 may send service request 216 to request the services provided by external data service 208.

As discussed above, process engine 203 may process one or more of workflows 206 and generate one or more work items for the workflow. While processing a workflow, process engine may determine if the workflow being processes matches a workflow identified in registration request 214. If the workflow processed by process engine 203 matches one of the targets identified in registration request 214, application server 202 may send service request 216 to external data service 208 to invoke one or more external services for the specified workflow. Service request 216 may indicate the workflow or the data fields for which metadata service is requested. In some examples, service request 216 may be a HyperText Transfer Protocol (HTTP) request that includes the URL provided by registration request 214. For example, if metadata service 210 provides metadata for data fields of a specific workflow, and process engine 203 processes the workflow that includes those data fields, metadata service 210 may, in response to receiving service request 216, send metadata 212A-212N ("metadata 212") for those data fields of the workflow to application server 202. In some examples, metadata 212 may be sent in JavaScript Object Notation (JSON) format or any other suitable format.

External data service 208 may also provide validation service 209 to application server 202 to validate values of data fields in workflows 206. As discussed above, external data service 208 may register itself in registration request 214 as providing validation service 209 to one or more data fields of workflows 206. In response to receiving service request 216, validation service may send code to application server 202 that, in response to a value being entered into a data field that is validated by validation service 209, causes validation request 220 to be sent to external data service 208. The validation request 220 may include the value that was inputted into the data field. In response, validation service 209 may validate the inputted value and may send a validation response 222 to application 202. The validation response 222 may include an indication whether the inputted value was valid or invalid. In some examples, the workflow may not be able to proceed until a valid value has been inputted into a data field which utilizes validation service 209. Process engine 203 may, in response to receiving the metadata code and/or code for validating data field values, incorporate the received code into the web application for the specific workflow.

Figure 3:
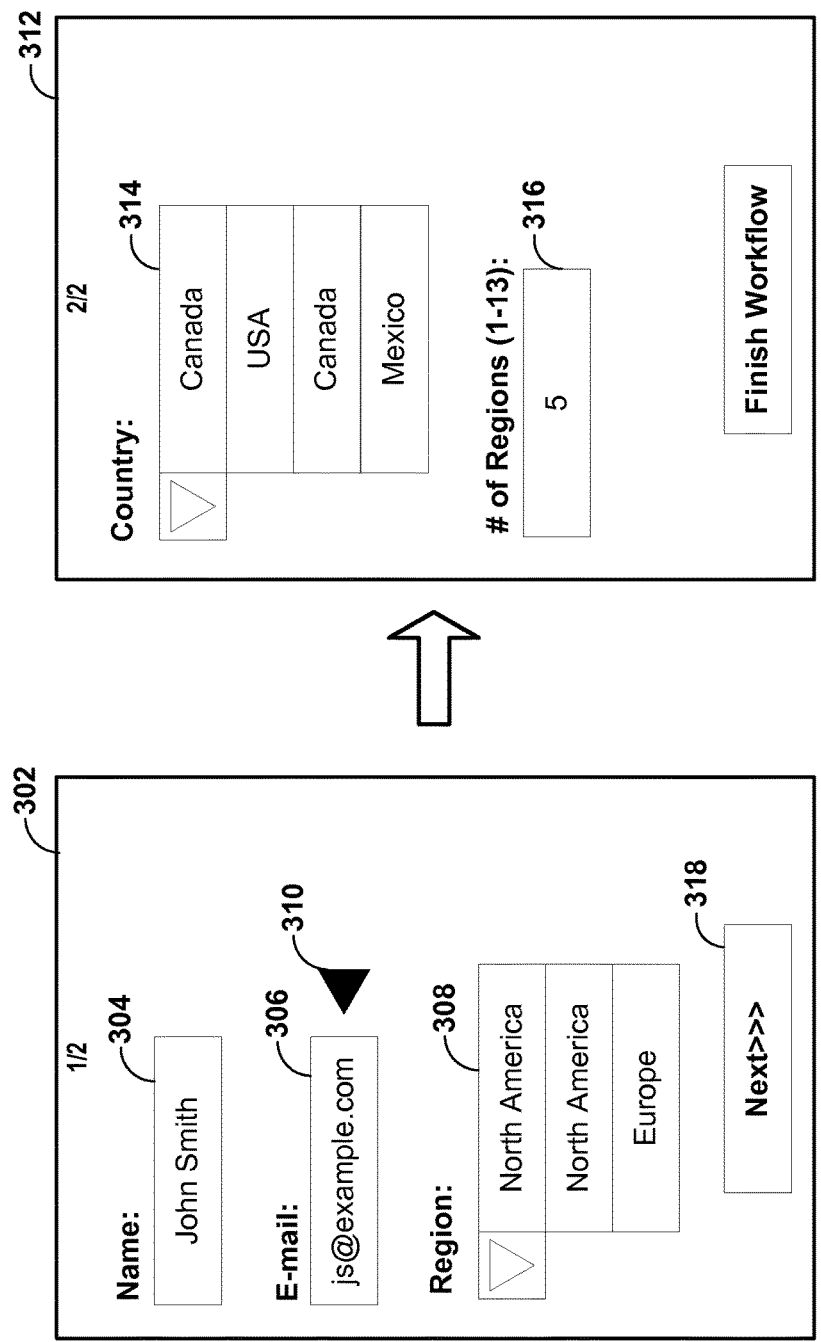
FIG. 3 shows a conceptual diagram of an example user interface that includes example user interface elements that represent example data fields, according to some aspects of the present disclosure.

FIG. 3 shows a conceptual diagram of an example user interface that includes example user interface elements that represent example data fields according to some aspects of the present disclosure. In some examples, the example user interface may be rendered by a web browser, such as web browser 224 shown in FIG. 2, and may be displayed by display device operably coupled to a client, such as one of clients 104 shown in FIG. 1.

In one example, an application server may process a workflow associated with content hosted on data sources, such as data sources 116 shown in FIG. 1. A workflow may define a series of tasks to be performed based on the associated content. To that end, a workflow may include a series of work items, where each work item includes a set of tasks to be completed.

The workflow may be presented one work item at a time as an ordered series of work items to a user, and a user may be required to complete one work item before being able to proceed to work on the next work item in the workflow. The user may complete the work flow by working through the series of work items in the workflow. In some examples, a workflow may be completed by multiple users, so that each of the users is responsible for completing some of the work items in the workflow. Some of the tasks to be completed in a work flow may include inputting values into data fields or otherwise setting values for data fields. As discussed above, a workflow may be processed to generate an application, such as a web application, that a user may view or otherwise interact with to input values into data fields of the workflow.

As shown in FIG. 3, a user interface for an application generated from a workflow may include user interface 302 of a first set of work items in the workflow and user interface 312 of a second set of work items in the same workflow as the first work item. In some examples, user interface 302 and user interface 312 may be rendered by a web browser for display at a display device operably coupled to a computing device. User interfaces 302 and 312 may include user interface controls that visually represent data fields of the workflow. More specifically, the data fields that are visually represented in user interfaces 302 and 312 may include name field 304 for inputting a name, e-mail field 306 for inputting an e-mail address, region field 308 for selecting a region, country field 314 for selecting a country, and number field 316 for inputting a number. One or more of the data fields 304, 306, 308, 314, and 316 may be associated with metadata, and the metadata may define the behavior of the associated data field in user interface 302.

Metadata may, in some cases, define an associated data field as being required. If a data field is defined by its metadata as being required, then the user interface may require that a value be entered by a user into the data field before allowing further processing of the work item. Furthermore, the user interface may enhance the visual presentation of the data field, such as by rendering a graphical marker to denote the data field as being required. As shown in FIG. 3, e-mail field 306 may be associated with metadata that defines e-mail field 306 as being required, and user interface 302 may include graphical marker 310 that indicates that the user is required to input a value into e-mail field 306 before user may proceed to a next work item. For example, next button 318 may be disabled in user interface 302 until a value has been entered into e-mail data field 306.

Metadata may also define a display label for an associated data field. Typically, the display label may be a text string that is displayed at the user interface near the data field that allows a user to understand the kind of value that the user should input into the associated data field. As, show in FIG. 3, each of the data fields 304, 306, 308, 314, and 316 is associated with metadata defining a display label. For example name field 304 may be associated with metadata that defines a display label of "Name:" to be displayed at user interface 302 near name field 304, e-mail field 306 may be associated with metadata that defines a display label of "E-mail:" to be displayed at user interface 302 near e-mail field 306, and region field 308 may be associated with metadata that defines a display label of "Region:" to be displayed at user interface 302 near region field 308.

Metadata may also define an associated data field as hidden. Defining the associated data field as hidden may cause the data field to not be displayed at the user interface.

Metadata may also define an associated data field as read-only or as editable. Defining the associated data field as read-only may cause the user interface to not allow the data field to be edited by the user. Conversely, defining the associated data field as editable may cause the user interface to allow the value of the data field to be edited by the user. In some examples, if the basic metadata does not explicitly define the associated data field as read-only, the data field may, by default, be defined as editable and the user interface may allow the value of the data field to be edited by the user. As shown in FIG. 3, because each of the data fields 304, 306, 308, 314, and 316 are editable, then none of the data fields are associated with metadata that define an associated data field as hidden.

Metadata may also define a value for an associated data field. If the associated data field already has an existing value, the value defined by the metadata may overwrite the existing value. In some examples, the value defined by the metadata may be a default value that is initially displayed in the user interface control that represents the data field in the user interface.

Metadata may also define minimum and/or maximum values for an associated data field. Defining a minimum value for the data field may cause the user interface to not allow a user to enter a value into the data field that is smaller than the defined minimum value. Conversely, defining a maximum value for the data field may cause the user interface to not allow the user to enter a value into the data field that is larger than the defined maximum value. As shown in FIG. 3, number field 316 may be associated with metadata that both defines a minimum value and a maximum value (i.e., 1-13).

Metadata may also define the format of values for an associated data field. As shown in FIG. 3, e-mail field 306 may be associated with metadata that defines the format of values for e-mail field 306 so that only values that are in valid e-mail formats (e.g., a string followed by a '@' character followed by a string, followed by a '.' character, and followed by a three-character string) are accepted into e-mail field 306.

The metadata may also define a custom display order index for associated data fields. For example, the metadata may provide order information for the fields that specifies the order in which the data fields are displayed in user interface 302 and 312. For example, data fields 304, 306, and 308 in user interface 302 may each be associated with metadata that defines a custom display order index for each data field, so that those data fields are ordered in user interface 302 according to the display order index.

The following code is an example JavaScript Object Notation (JSON) code for metadata that defines an associated data field having a symbolic name of "string 1" as being required and as accepting an input value with a maximum length of 300 characters:

```
{
    "symbolicName": "string1",
    "required": true,
    "maxLength": "300"
}
```

The following code is an example JSON code for metadata that defines an associated data field having a symbolic name of "date1" as having a display label of "My Birthday" and as having a value of "1977-09-10T09:28:27 Z":

```
{
    "symbolicName": "date1",
    "label": "My Birthday",
    "value": "1977-09-10T09:28:27Z"
}
```

The following code is an example JSON code for metadata that defines an associated data field having a symbolic name of "boolean1" as being hidden:

```
{
    "symbolicName": "boolean1",
    "hidden": true
}
```

The following code is an example JSON code for metadata that defines an associated data field having a symbolic name of "integer1" as being read only and as having a value of 44:

```
{
    "symbolicName": "integer1",
    "displayMode": "readonly",
    "value": 44
}
```

The following code is an example JSON code for metadata that defines an associated data field having a symbolic name of "float1" as having a minimum value of 10.0, a maximum value of 100.0, and as having a default value of 10.01:

```
{
    "symbolicName": "float1",
    "minValue": "10.0",
    "maxValue": "100.0",
    "value": 10.01
}
```

The following code is an example JSON code for metadata that defines an associated data field having a symbolic name of "string2" as accepting only values that follow a specified format of an e-mail address:

```
{
    "symbolicName": "string2",
    "format": "\\b[\\w\\.-]+@[\\w\\.-]+\\.\\w{2,4}\\b",
    "formatDescription": "color@isp.com",
    "value": ["red@ibm.com", "yellow@ibm.com",
```

```
        "blue@ibm.com"]
}
```

Metadata may also define a list of values for an associated data field that a user may select from to set a value for the data field. As shown in FIG. 3, region field 308 may be represented in user interface 302 as a drop-down list user interface element that lists multiple values. Region field 308 may be associated with metadata that specifies the values (i.e., North America and Europe) that populate the drop list.

The following code is an example JSON code for metadata that defines an associated data field as having a list of values:

```
{
    "symbolicName": "author1",
    "choiceList": {
        "displayName": "Authors",
        "choices": [
        {
            "displayName": "Stephen King",
            "value": "Stephen King"
        },
        {
            "displayName": "Robert Charles Wilson",
            "value": "Robert Charles Wilson"
        },
        {
            "displayName": "Vernor Vinge",
            "value": "Vernor Vinge"
        }]
    }
}
```

Metadata may also define dependent properties for an associated data field. As shown in FIG. 3, the values listed in country field 314 of user interface 312 may depend on the value selected in region field 308 of user interface 302. For example, because North America is selected in region field 308, country field 314 may include a list of North American countries (i.e., Canada, USA, and Mexico). If Europe had instead been selected in region field 308, country field 314 may be changed to include a list of European countries.

The following code is an example JSON code to specify a metadata that dependent properties as described above:

```
{
    "symbolicName": "author1",
        :
    "hasDependentProperties": true
},
{
    "symbolicName": "count1",
    "dependentOn": "author1",
    "dependentValue": "Stephen King",
    "choiceList": {
        "displayName": "Small Numbers",
        "choices": [{
            "displayName": "one",
            "value": "1"
        },
        {
            "displayName": "two",
            "value": "2"
        }]
    }
},
{
    "symbolicName": "count1",
    "dependentOn": "author1",
```

```
    "dependentValue": "Robert Charles Wilson",
    "choiceList": {
        "displayName": "Medium Numbers",
        "choices": [{
            "displayName": "ten",
            "value": "10"
        },
        {
            "displayName": "twenty",
            "value": "20"
        }]
    }
}
```

As shown in the code above, the values available for the data field having the symbolic name of "count1" depends on whether the value of the data field having the symbolic name of "author1" is "Stephen King" or "Robert Charles Wilson".

Figure 4:
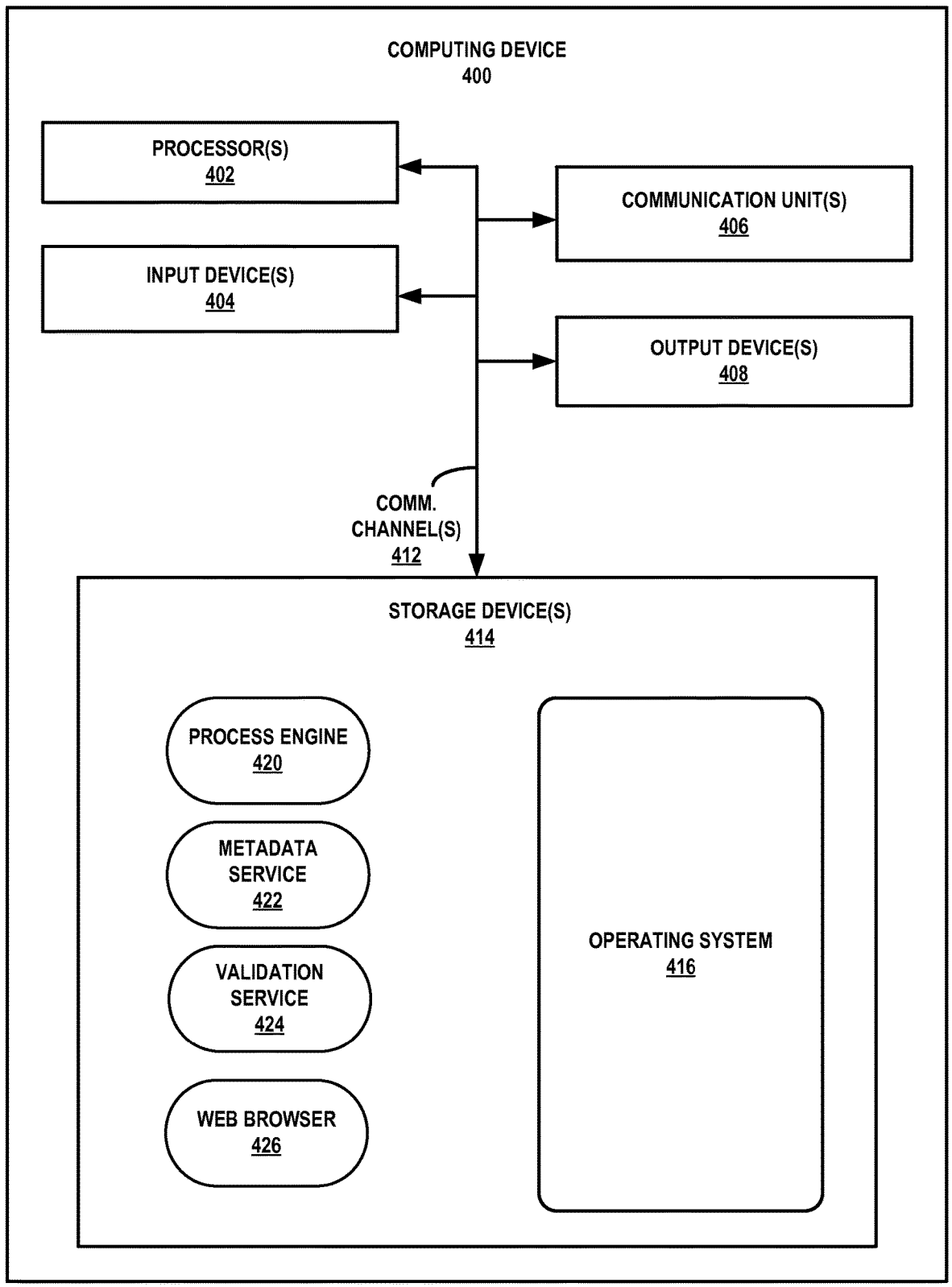
FIG. 4 is a block diagram illustrating an example computing device, according to some aspects of the present disclosure.

FIG. 4 is a block diagram illustrating an example computing device according to some aspects of the present disclosure. Computing device 400 may be one example of an application server, such as application server 202, a client, such as client 204 shown in FIG. 2, or a computing device that includes an external data service, such as external data service 208 shown in FIG. 2. In other examples, computing device 400 can include fewer, additional, or different components compared to those illustrated in FIG. 4. As shown in the example of FIG. 4, computing device 400 may include one or more processors 402, one or more input devices 404, one or more communication units 406, one or more output devices 408, and one or more storage devices 414. In this example, storage devices 414 of computing device 400 may include operating system 416, one or more of process engine 420, metadata service 422, validation service 424, and web browser 426. Communication channels 412 may interconnect each of the components 402, 404, 406, 408, and 414 for inter-component communications (physically, communicatively, and/or operatively). In some examples, communication channels 412 may include a system bus, a network connection, an inter-process communication data structure, or any other method for communicating data.

One or more input devices 404 of computing device 400 may receive input. Examples of input are tactile, audio, and video input. Input devices 404 of computing device 400, in one example, include a presence-sensitive display, touch-sensitive screen, mouse, keyboard, voice responsive system, video camera, microphone or any other type of device for detecting input from a human or machine.

One or more output devices 408 of computing device 400 may generate output. Examples of output are tactile, audio, and video output. Output devices 408 of computing device 400, in one example, include a presence-sensitive display, sound card, video graphics adapter card, speaker, cathode ray tube (CRT) monitor, liquid crystal display (LCD), or any other type of device for generating output to a human or machine.

One or more communication units 406 of computing device 400 may communicate with wired or wireless external devices via one or more networks by transmitting and/or receiving network signals on the one or more networks. For example, computing device 400 may use communication units 406 to transmit and/or receive radio signals on a radio network such as a cellular radio network. Likewise, communication units 406 may transmit and/or receive satellite signals on a satellite network such as a GPS network. Examples of communication units 406 include a network interface card (e.g. such as an Ethernet card), an optical transceiver, a radio frequency transceiver, a GPS receiver, or any other type of device that can send and/or receive information. Other examples of communication units 406 may include Bluetooth®, GPS, 3G, 4G, and Wi-Fi® radios found in mobile devices as well as Universal Serial Bus (USB) controllers.

One or more storage devices 414 within computing device 400 may store information required for use during operation of computing device 400. Storage devices 414, in some examples, have the primary purpose of being short term and not long-term computer-readable storage mediums. Storage devices 414 on computing device 400 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. Storage devices 414 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 414 may store program instructions and/or data associated with one or more of process engine 420, metadata service 422, validation service 424, and web browser 426.

One or more processors 402 may implement functionality and/or execute instructions within computing device 400. For example, processors 402 on computing device 400 may read and execute instructions stored by storage devices 414 that execute the functionality of one or more of process engine 420, metadata service 422, validation service 424, and web browser 426. These instructions executed by processors 402 may cause computing device 400 to store information within storage devices 414 during program execution. Processors 402 may execute one or more of process engine 420, metadata service 422, validation service 424, and web browser 426 to perform various actions.

If computing device 400 is an application server, then storage devices 414 may include process engine 420. Process engine 420 may be similar to process engine 203 shown in FIG. 2. Process engine 420 may execute on processors 402 to process workflows and to generate one or more work items for a workflow. Process engine 420 may also generate a computer application, such as a web application, that a user may use and interact with in order to input data values into data fields of the workflow to complete the work items of the workflow that are assigned to the user. Process engine 420 may receive one or more registration requests from external data services, such as metadata 422 and validation service 424 that registers those services with one or more data fields of a workflow. Process engine 420 may determine if a workflow being processed includes one or more data fields that match the data fields identified in the one or more registration requests from external data services and may send one or more service requests to metadata service 422 and/or validation service 424. In response, process engine 420 may receive metadata code from metadata service 422 and/or validation code from validation service 424. Process engine 420 may generate an application, such as a web application based on the processed workflow and the code received from metadata service 422 and/or validation service 424. The generated application may be accessed by, for example, web browser 426.

If computing device 400 includes an external data service, then computing device 400 may include metadata service 422 and validation service 424. Metadata service 422 may be similar to metadata service 210 shown in FIG. 2 and validation service 424 may be similar to validation service 209 shown in FIG. 2. Metadata service 422 and validation service 424 may both send registration requests to process engine 420 specifying data fields of workflows for which they will provide services. In response to receiving a service request from process engine 420, metadata service 422 and validation service 424 may send to process engine 420 metadata code and/or validation code that process engine 420 may incorporate in applications for workflows processed by process engine 424. If validation service 424 provides validation services for a data field, validation service 424 may receive requests to validate values inputted into the data field. Validation service 424 may validate the inputted value based on one or more parameters and may return an indication of whether the inputted value is valid.

If computing device 400 is a client device, then computing device 400 may include web browser 426. Web browser 426 may be similar to web browser 224 shown in FIG. 2. Web browser 426 may access web applications generated by process engine 420. For example, web browser may interpret, execute, or otherwise process the code making up the web applications generated by process engine, including processing metadata code and/or validation code provided by metadata service 422 and validation service 424 so that the data fields of the web applications are constrained according to the one or more characteristics defined by the metadata.

Figure 5:
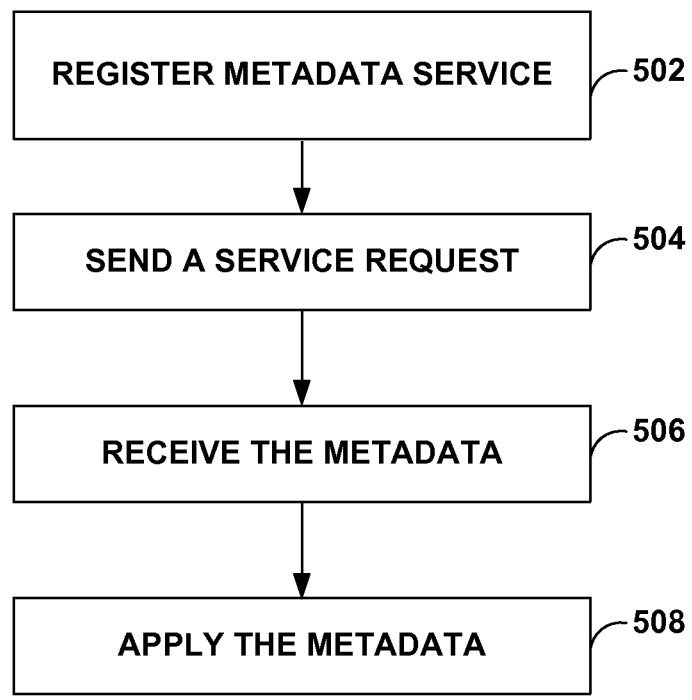
FIG. 5 is a flowchart illustrating an example process to enhance the metadata of data fields in a workflow, according to some aspects of the present disclosure.

FIG. 5 is a flowchart illustrating an example process to enhance the metadata of data fields in a workflow according to some aspects of the present disclosure. As shown in FIG. 5, an application server, such as application server 202 shown in FIG. 2, may query an external data service, such as external data service 208 shown in FIG. 2, for external services provided by the external data service and, in response, may receive a registration request from the external data service to register a metadata service for providing metadata that defines one or more characteristics of a data field in an application. In response, the application server may register the metadata service for providing metadata that defines one or more characteristics of a data field of a workflow processed by a process engine, such as process engine 203 shown in FIG. 2 (502). Registering the metadata service may include associating the metadata service with the data field.

A process engine on the application server, such as process engine 203 shown in FIG. 2, may begin processing of a workflow, including processing the data fields in the workflow. The process engine may create one or more work items for the workflow, and the work items may each include one or more data fields. Process engine may also identify a workflow as having one or more external services registered by external data service. In response to processing the data field of the workflow and determining that the metadata service is registered to provide metadata to one or more data fields of a workflow being processed by process engine, process engine may send a request to the metadata service for metadata registered with the data field (504). In some examples, the metadata service may be external to the process engine but may still reside on the same server or system as the process engine. In other examples, the metadata may reside on a server external to the server that stores the process engine. In response to receiving the request, the metadata service may send the metadata for the one or more data fields to the application server. In some examples, sending the metadata may include sending code, such as JSON code, that defines the metadata for the one or more data fields.

The application server may receive the metadata provided by the metadata service for the data field (506) and may apply the received metadata to the data field such that that the data field as presented in a user interface is constrained according to the one or more characteristics defined by the metadata (518). For example, the application server may generate code defining or controlling the behavior of the data field according to the metadata when the data field is presented at a user interface. If the data fields are presented via a web browser to a user, then the application server may generate, based on the received metadata, web-based code (e.g., JavaScript) that affects the behavior of the associated data fields. An application, such as a web browser running at a computing device, may render the web application that includes the data fields of the workflow. The application may present the workflow as a series of work items, and a user may complete the work items by entering values into the presented data fields.

In some examples, the one or more characteristics defined by the metadata may define the data field as being dependent upon a second data field, such that values listed by the data field are dependent upon a value inputted into the second data field. In some examples, the one or more characteristics defined by the metadata define a format to be used by values of the data field. In some examples, the one or more characteristics defined by the metadata define at least one of: the data field as being required; the data field as being hidden in the user interface; a display label for the data field in the user interface; the data field as being read only; a value for the data field that overwrites any existing value of the data field; a minimum value for the data field; and a maximum data value for the data field.

In some examples, the application server may further register a validation service for validating input values of the data field, wherein registering the validation service includes associating the validation service with the data field. In response to receiving the input value to the data field, a request may be sent to the validation service to validate the input value of the data field. A validation response may be received that indicates whether the input value is valid for the data field.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Various embodiments of the disclosure have been described. These and other embodiments are within the scope of the following claims.

The invention claimed is:

1. A method comprising:
   receiving, by at least one processor, a registration request from an external data service, wherein the registration request identifies a data field of a workflow and identifies a metadata service to the data field of the workflow, and wherein the external data service is external to an application server;
   in response to processing the workflow, requesting, by the at least one processor, a metadata for the data field from the metadata service;
   in response to receiving the metadata, enhancing, by the at least one processor, the data field by applying the metadata to the data field such that at least one of a desired appearance, a behavior, or input values associated with the data field, as presented in a user interface, are constrained according to the metadata; and
   displaying the enhanced data field in the user interface.

2. The method of claim 1, wherein the metadata defines a dependency of the data field on a second data field.

3. The method of claim 1, wherein the metadata defines a format to be applied to the input values of the data field.

4. The method of claim 1, wherein the metadata defines at least one of:
   the data field as being required;
   the data field as being hidden in the user interface;
   a display label for the data field in the user interface;
   the data field as being read only;
   a value for the data field that overwrites any existing value of the data field;
   a minimum value for the data field; and
   a maximum data value for the data field.

5. The method of claim 1, wherein the external data service further provides a validation of the input values of the data field.

6. The method of claim 5, wherein the validation of the input values is performed by an external validation service.

7. The method of claim 1, wherein the metadata comprises JavaScript Object Notation (JSON) code.

8. The method of claim 1, further comprising associating with another data field another external data service that identifies another metadata to be applied to the another data field.

9. The method of claim 1, wherein the external data service is stored at another server.

* * * * *